RELAY SEQUENCE DIAGRAM 2,712,647
Patented July 5, 1955

United States Patent Office

2,712,647

ELECTRONIC ANGLE MARKER FOR FIXED-COIL PLAN POSITION INDICATORS

Chalmers W. Sherwin, Champaign, Ill., assignor to United States of America as represented by the Secretary of the Navy Application September 13, 1946, Serial No. 696,927

18 Claims. (Cl. 343—11)

This invention relates to an electronic angle marker for fixed-coil plan position indicators.

A primary object of this invention is to provide an electronic angle marker for fixed-coil plan position indicators in which the errors introduced by the sweep amplifiers, deflection coil system, and parallax are avoided.

A further object of this invention is to provide an electronic angle marker for fixed-coil plan position indicators occurring at a different time from the video signals thereby eliminating the "blooming" ordinarily associated with markers.

A still further object of this invention is to provide an electronic angle marker for fixed-coil plan position indicators which can be set on a persistent video indication although the normal video trace is in an entirely different section of the cathode-ray screen, thus making it unnecessary to wait for one or more complete revolutions of the antenna to accurately position the video indication.

Other objects and advantages of this invention will be apparent from the following description and drawings, in which.

Fixed-coil plan position indicators have the feature that a radial sweep trace presented thereon can take any desired direction in a very short time since the only inertia present in the deflecting system is that of the electron beam. There is some inertia lag in the driving circuits due to the time constants of those circuits; but this lag can be made less than 200 to 500 microseconds, whereas delays up to one-half second are usable in many applications. Thus the sweep trace of the plan position indicator can be alternated rapidly for two uses: (1) present the normal radar video indications, and (2) present an angle marker whose angular position can be set in any direction. A movable range marker may be included on this latter presentation allowing a direct means of measuring range.

Figure 1:
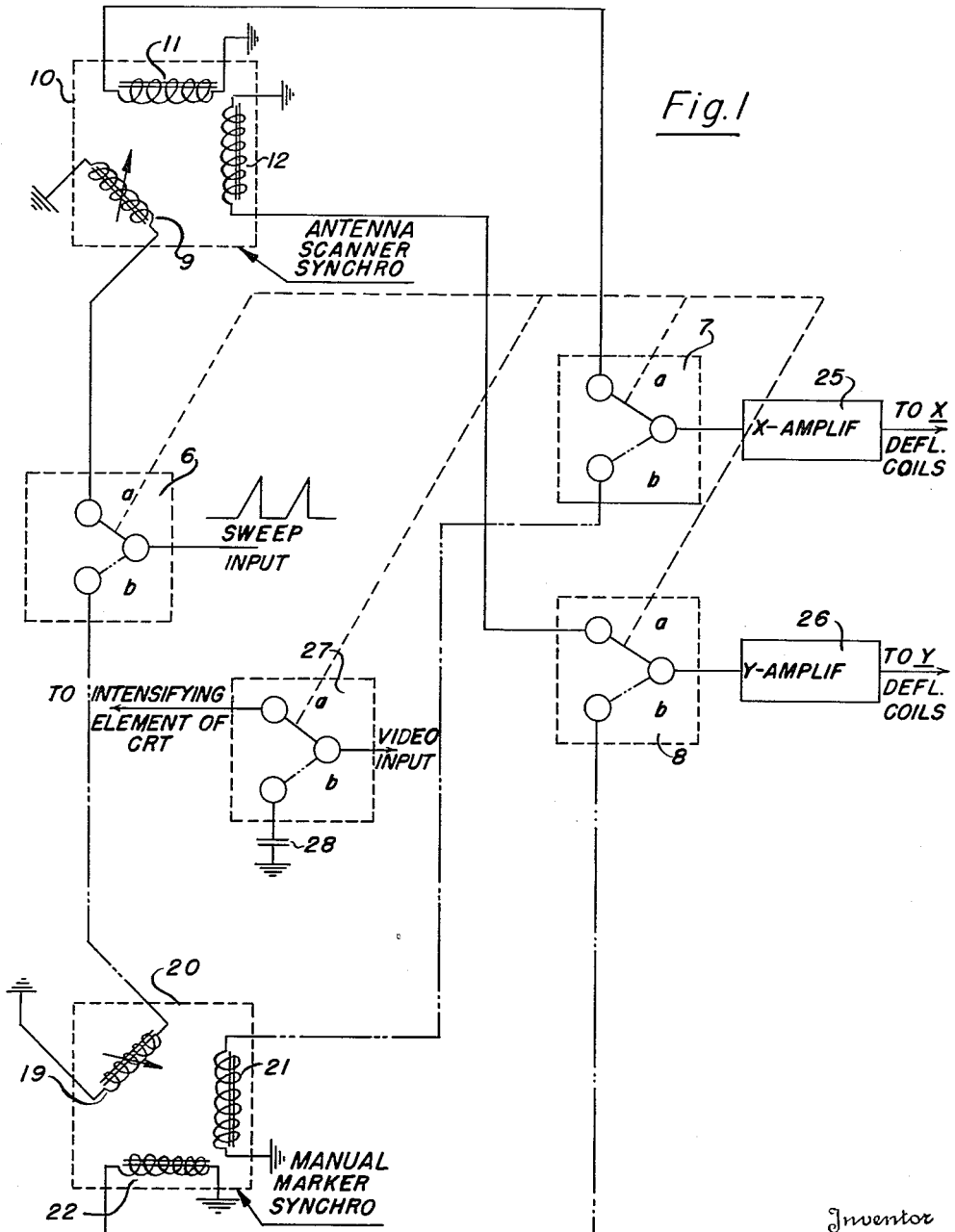
Fig. 1 is a diagram of the basic circuit of the invention.

In Fig. 1, three ganged switches 6, 7 and 8 provide the means for alternating the presentation on the cathode-ray screen. Switch 6 has its common terminal connected to the source of the required sweep voltage. One of the selective contacts is connected to the rotor winding 9 of the synchro 10, the remaining contact of the switch 6 being connected to the rotor winding 19 of a second synchro 20. The quadrature-positioned windings 11 and 12 of the synchro 10 are connected to each of the selective contacts of switches 7 and 8 respectively. Similarly, the quadrature-positioned windings 21 and 22 of the synchro 20 are connected to each of the remaining selective contacts of the switches 7 and 8 respectively. The common terminals of the switches 7 and 8 are connected to the input of an X-axis amplifier 25 and Y-axis amplifier 26 respectively, the outputs of these amplifiers being connected to the horizontal and vertical coils of the cathode-ray tube. A fourth switch 27 is ganged with the previously-described switches 6, 7 and 8. The common terminal of this switch 27 is connected to the video output of a radar system, one selective contact being connected to the intensifying element of the cathode-ray tube and the other selective contact being grounded through a video by-pass condenser 28.

In one phase of operation of this invention, all of the ganged switches are in position a. This provides a plan-position indication of the sweep traces as positioned by the synchro 10, the rotor 9 of which can be conveniently connected to the revolving antenna of the radar system. The video presentation is normal in this position of the ganged switches. At some time later, the ganged switches are placed in position b whereupon the sweep trace is positioned by the synchro 20, the rotor 19 of which can be conveniently controlled manually. The video signal is by-passed to ground through the condenser 28 in this position thereby providing a sweep trace free from the "blooming" or fuzziness caused by random noise in the video signal. The delay in the indicator's taking this new position, due to the amplifiers and the deflection system, can be made less than 200 microseconds. There is an additional delay due to the finite transit time of the switches which can be reduced by the use of relay switches or electronic switches such as clamping circuits. In the use of relay switches, it is advisable to use an additional relay to de-intensify the cathode-ray tube during and shortly after the switching operation. This can be done by conventional means such as providing a switching sequence wherein the closing of one relay causes a second relay to begin closing.

In the case of electronic switching it is possible to switch over to the secondary synchro, or marker synchro as it will hereinafter be referred to, for, say, only one or two sweeps out of twenty or thirty and then to switch back to the primary or scanner synchro from which the video signal is presented. The amount of time taken for the marker presentation can be made very small in relation to the time during which the video signal is present on the customary scanning sweep trace and, in all events, unnoticeable to an observer watching the pan position indicator screen. In some applications it is also possible to generate extra range sweeps between the ordinary range sweeps on which the video appears. During these extra range sweeps the marker synchro can be switched in by the electronic switches. With electronic switching, it is necessary to perform the switching between sweeps when the cathode-ray tube is normally blanked-out, or to generate a blanking signal during the time that transients are objectionable. This can be done with conventional circuits familiar to those skilled in the art.

Figure 2:
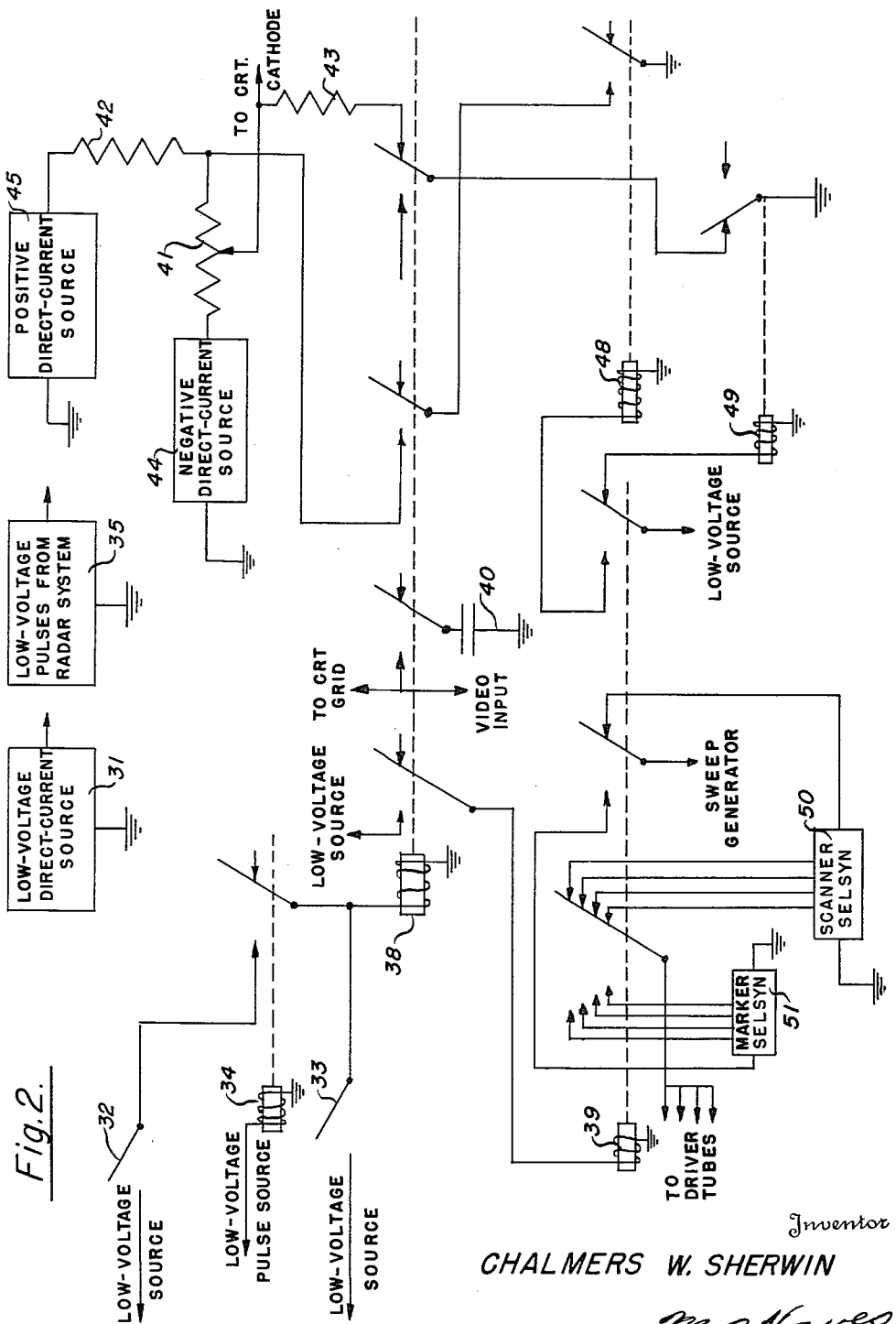
Fig. 2 is a circuit diagram of an operative form of the proposed invention.

In a more complete equipment as shown by Fig. 2, a positive low-voltage direct-current source 31 with a suitable ground connection is connected to a single terminal of a toggle switch 32 and also to a single terminal of a microswitch 33. The remaining terminal of the toggle switch 32 is connected to a selective contact of a relay 34, the winding of which is connected to the output of a device 35 providing periodic low-voltage pulses from the radar system, suitable ground connections being provided for the relay 34 and the pulse device 35. The remaining terminal of the microswitch 33 connects with the common contact of the relay 34 and the winding of a second relay 38 which is provided with a suitable ground connection. Relay 38 contains four sets of ganged contacts, associated by dotted lines, one set of which connects the direct-current source 31 with the windings of a third relay 39 when relay 38 is energized, suitable ground connections being made for the relay 39. A second set of contacts of the relay 38 serves to by-pass the video signal to ground through a capacitor 40 when relay 38 is energized. The third and fourth contacts of the relay 38 serve to provide a flexible resistance voltage divider network composed of the resistors 41, 42, and 43 in addition to the negative direct-current source 44 and the positive direct-current source 45, the common junction between the arm of resistor 41 and the resistor 43 being connected to the cathode of the cathode-ray tube to provide the necessary voltage to that element. To complete the flexible network other connections are made from the third and fourth sets of contacts of the relay 38 to two additional relays 48 and 49 which are selectively energized by the action of the relay 39. These relays 48 and 49 establish ground potentials to the various points of the resistance voltage divider network depending upon the condition of energization or de-energization of these relays 48 and 49 which in turn depend upon the relay 39 and hence the relay 38. The energizing source for the relays 48 and 49 is again the low-voltage direct-current source 31 connected to a common contact of a set of contacts of the relay 39 thus alternately providing the windings of the relays 48 and 49 with energizing voltage, suitable ground connections being provided for both relays. The remaining sets of contacts of relay 39 selectively shift the output of the radar sweep generator to either the rotor of the scanner selsyn 50 or the marker selsyn 51 and further select an output either from the stator windings of the scanner selsyn 50 or the marker selsyn 51 and apply this output to the input circuits of the sweep driver tubes of the radar system. The rotor of the scanner selsyn 50 is preferably mechanically, electrically, or otherwise connected to the rotating shaft of the scanner or antenna of the radar equipment whereas any suitable means are provided for manually positioning the rotor of the marker selsyn 51 as desired.

The angle mark is obtained by momentarily replacing the scanner selsyn 50 with the marker selsyn 51 whose rotor position is controlled by the operator. The cathode-ray tube is blanked out during the switching operation and shortly thereafter to prevent the appearance of transients of the indicator screen. This is made possible by applying a positive gate to the cathode of the cathode-ray tube during this switching period. All of the video signals are by-passed to ground through the condenser 40 for the duration of the marker's appearance on the screen. The intensity of the angle marker is regulated by controlling the amplitude of the negative gate applied to the cathode of the cathode-ray tube.

A continuous marker may be obtained by depressing the microswitch 33 to begin the sequence of operation of the switching relays. The marker then appears as long as the microswitch 33 is depressed. For normal periodic operation, the toggle switch 32 is placed in the "on" position. Periodic low-voltage pulses from the radar system energizing the relay 34 begin the sequence of switching operations as before, but at a repetition rate equal to the repetition rate of the periodic pulses. The pulses can be regulated within the radar system so as to only occur at the time the antenna reaches a position corresponding to the selected position of the marker rotor or may be made to occur periodically at any other convenient time according to the demands of the particular radar installation and usage.

Figure 3:
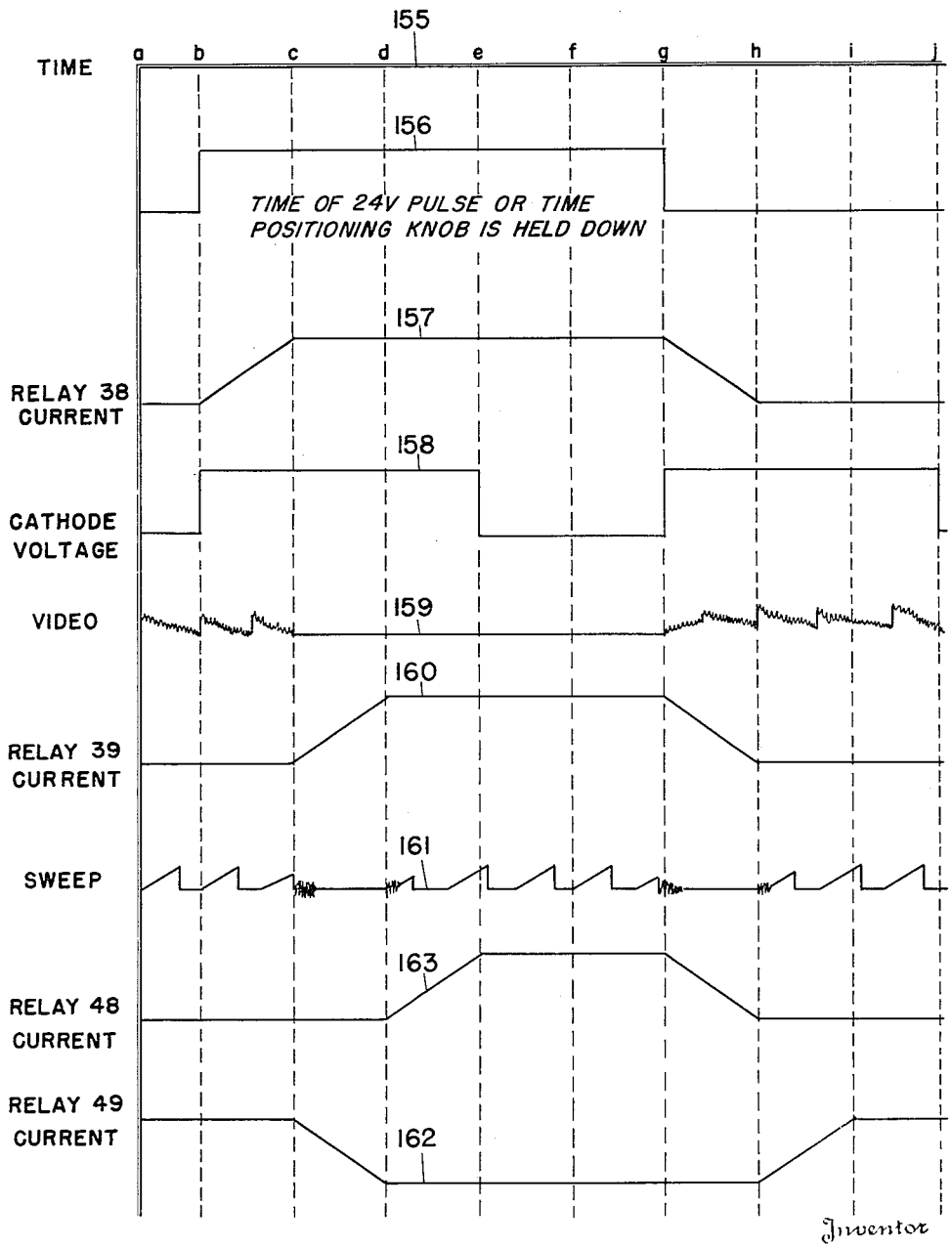
Fig. 3 shows a series of voltage waveforms present at various electrical points of the embodiment of Fig. 2.

For normal operation, the relays are in the position shown in Fig. 2; and the cathode of the cathode-ray tube is near ground potential, the video is normal, the sweep driver tube inputs are connected to the stators of the scanner selsyn 50, and the sweep generator is connected to the rotor of the scanner selsyn 50. The sequence of events is started by the energization of the relay 34 by a low-voltage pulse from the radar system or depression of the microswitch 33. The wave forms of the operations are shown in Fig. 3 in which the line 155 represents a linear time base with various intervals of time denoted by the letters $a$, $b$, $c$, $d$, $e$, $f$, $g$, $h$, $i$ and $j$. The time $a$—$b$ shows the normal operation. At the point $b$ the wave form 156 shows the low-voltage pulse for the time duration $b$—$g$. The low-voltage pulse causes the current to begin to build up in the relay 38 until it has reached a maximum at time $c$. During this time the common contacts of the relay 38 have moved from their extreme right position to the left, finally completing the contacts at the extreme left at time $c$. This operation is shown by the wave form 157. At the end of the low-voltage pulse at time $g$, the current through relay 38 begins to decay and the common contacts move again to the right, reaching the extremes of their travel at time $h$. The action of the fourth set of contacts of the relay 38 has removed the ground from the voltage divider network; specifically, the resistor 43, at the time $b$ and the voltage to the cathode of the cathode-ray tube is made very positive and thus blanking the tube. The wave form of the cathode voltage is shown by the wave form 158. At time $c$, complete energization of relay 38 causes several actions. The normal video signals will be by-passed to ground through the condenser 40 as shown by wave form 159. Current begins to flow in relay 39 which removes the energization from relay 49, and removes the connections to the scanner selsyn 50 causing the undesirable transients to appear in the sweep trace. Thus at time $c$, wave form 161 shows the undesirable transients on the sweep trace, and wave form 162 shows the decline of the current in relay 49. At time $d$ when relay 39 is completely energized, other transients appear on the sweep wave form 161 as connections are made to the marker selsyn 51; and current begins to flow in the relay 48 as shown by the wave form 163. After the transients have dissipated upon positive closing action of the relay contacts of relay 39 with the marker selsyn 51, the sweep wave form 161 now contains the sweep trace as presented by the marker selsyn. As relay 48 becomes completely energized at time $e$, the resistance voltage divider network is grounded at the junction point between resistors 41 and 42, and the voltage to the cathode of the cathode-ray tube goes negative sufficiently to intensify the screen of the tube and the marker trace is presented thereon in the absence of any video. At time $g$, the low-voltage pulse is removed and immediately relays 38, 39 and 48 become de-energized and the current through them begins to decay. Immediately, the ground is removed from the voltage divider network, the by-pass is removed from the video signal, and transients appear on the sweep wave form as connections are broken to the marker selsyn 51. When the current through relay 39 decays to zero at time $h$, contact is again made to the scanner selsyn 50 and transients again appear on the sweep wave form 161; and further, current begins to flow in relay 49. When this current through relay 49 reaches normalcy, a ground is again provided to the voltage divider network at the lower end of resistor 43, and the cathode voltage returns to the normal negative bias for normal scanner trace presentation and video signal, and the cycle has been completed. Resistor 41 is in the form of a potentiometer for varying the intensity of the marker to a convenient level.

Those familiar with the art will recognize the variations possible in the embodiment presented, and it is to be understood that the inventor does not wish to be limited to the particular embodiment shown.

What is claimed is:

1. In a plan position indicator having a cathode ray tube including deflecting control elements, a sweep generator, a scanner selsyn including rotor and stator windings, a source of video signals, means for applying said signals to the intensity control element of said tube, a low voltage pulse source, and a steady low-voltage source, the apparatus comprising a first relay energizable by said pulse source; a second relay energized from said steady voltage source by said first relay; an angle marker selsyn having rotor and stator windings; and a third relay controlled by said second relay, said third relay being arranged to connect said control elements to the stator windings of said marker selsyn or to the stator windings of said scanner selsyn, selectively, and to connect said sweep generator to the rotor winding of said marker selsyn or to the rotor winding of said scanner selsyn, selectively.

2. The apparatus as described in claim 1 and means controlled by said second relay for grounding said video signals during the selecting periods of said third relay.

3. The apparatus as described in claim 1 and means for grounding said video signals during the selecting period of said third relay.

4. The apparatus as described in claim 1 and a fourth relay controlled by said third relay; a fifth relay controlled by said third relay, said fourth and fifth relays being energized by said steady voltage source; a voltage divider network comprising a resistance connected between a positive and negative direct current source, the cathode of said cathode ray tube being connected to said resistance; means controlled by said second relay for selectively grounding said video signals, for selectively connecting a first point on said divider to a selective contact of said fifth relay for blanking out said cathode ray tube during the switching operations of said second relay, and for selectively connecting a second point on said divider to a selective contact of said fourth relay; said fourth relay cooperating with said voltage divider and ground to continue blanking out the cathode ray tube shortly after the switching actions of said second relay to prevent the appearance of transients on the screen presentation; and said fifth relay cooperating with said voltage divider and ground to bias the cathode ray tube sufficiently to intensify the screen presentation of an angle marker, whereby said plan position indicator presents normal video presentation when the relays are in the normal operating position, and presents an intensified angle marker presentation when the relays are selectively actuated to an alternative position.

5. In a plan position indicator having a cathode ray tube including deflection control elements, a sweep generator, a scanner selsyn including rotor and stator windings, a source of video signals for application to the intensity control element of said tube, and a steady low-voltage source, the combination of: a first relay energizable by said steady voltage source and having a selective contact adapted to be connected to said steady voltage source; a switch for controlling said relay adapted to be connected to said steady voltage source; an angle marker selsyn having rotor and stator windings; a second relay controlled by said first relay, said second relay being adapted to connect said control elements to the stator windings of said marker selsyn or to the stator windings of said scanner selsyn, selectively, and being adapted to connect said sweep generator to the rotor winding of said marker selsyn or to the rotor winding of said scanner selsyn, selectively.

6. The apparatus as described in claim 5 and means controlled by said first relay adapted to ground said video signals during the switching periods of said second relay.

7. The apparatus as described in claim 5 and means adapted to ground said video signals during the switching periods of said second relay.

8. The apparatus as described in claim 5 and third and fourth relays controlled by said second relay; said third and fourth relays being adapted to be energized by said steady voltage source; a voltage divider network comprising a resistance connected between a positive and negative current source, said resistance being adapted to be connected to the cathode of said cathode ray tube; means controlled by said first relay adapted to selectively ground said video signals, for selectively connecting a first point on said divider to a selective contact of said fourth relay for blanking out said cathode ray tube during the switching operations of said first relay, and for selectively connecting a second point on said divider to a selective contact of said third relay; said third relay being adapted to cooperate with said voltage divider and ground to continue blanking out the cathode ray tube shortly after the switching actions of said first relay to prevent the appearance of transients on the screen presentation; said fourth relay being adapted to cooperate with said voltage divider and ground to bias the cathode ray tube sufficiently to intensify the screen presentation for an interval of time necessary to present an angle marker; whereby said plan position indicator presents normal video presentation when the relays are in the normal operating position, and presents an intensified angle marker presentation when the relays are selectively actuated to an alternative position.

9. The combination of a fixed coil plan position indicator having a cathode ray tube including deflection control elements, a sweep generator, a scanner selsyn including rotor and stator windings, a source of video signals for application to the intensity control element of said cathode ray tube, a low voltage pulse source, and a steady low-voltage source; with a first relay energizable by said pulse source; a first power switch connected between a selective contact of said first relay and said steady voltage source; a second relay controlled by said first relay, a selective contact of said second relay being connected to said steady voltage source; a second power switch connected between said second relay and said steady voltage source; an angle marker selsyn having rotor and stator windings; and a third relay controlled by said second relay, said third relay being adapted to connect said deflection control elements to the stator windings of said marker selsyn or to the stator winding of said scanner selsyn, selectively, and synchronously therewith to connect said sweep generator to the rotor winding of said marker selsyn or to the rotor winding of said scanner selsyn, respectively.

10. The apparatus as described in claim 9 and means controlled by said second relay for selectively grounding said video signals.

11. The apparatus described in claim 9 and means for grounding said video signals during the switching periods of said third relay.

12. In a radiant energy plan position indicating system comprising an indicator having deflection and intensity control elements, and a source of video signals normally applied to said intensity control element; the apparatus for presenting angle markers on said indicator indicative of the position of an orientable device, said apparatus comprising: means for producing an angle marker signal; means for selectively applying said marker signal to said deflection control elements; means responsive to said applying means for preventing the application of said video signals to said intensity control element during the interval when said marker signal is applied; and means operable by said applying means for blanking out said indicator during the selecting operation of said applying means.

13. The apparatus according to claim 12 wherein said angle marker signal producing means comprises a selsyn device.

14. The apparatus according to claim 12 wherein said blanking means comprises a source of variable voltage, means operable by said applying means for supplying a portion of predetermined amplitude of said voltage to said indicator for blanking out said indicator during the selecting action of said applying means, and means operable by said applying means for supplying a different portion of said voltage to said indicator during the interval when said marker signals are being applied to said deflection control elements.

15. In a radiant energy plan position indicating system having an indicator including deflection and intensity control elements, a source of pulses, and a source of video signals normally applied to said intensity control elements; an apparatus for presenting angle markers on said indicator indicative of the position of an orientable device, said apparatus comprising: means for producing an angle marker signal; means responsive to said pulses for selectively applying said marker signal to said deflection control elements; means responsive to said applying means for preventing the application of said video signals to said intensity control element during the interval when said marker signal is applied; and means operable by said applying means for blanking out said indicator during the selecting operation of said applying means.

16. The apparatus according to claim 15 and means for manually operating said applying means independently of said pulses.

17. The apparatus according to claim 15 wherein said applying means comprises a first relay for connecting said producing means to said deflection control elements when said relay is energized; and a second relay responsive to said pulses for energizing said first relay.

18. The apparatus according to claim 17 wherein said applying means further comprises means for manually operating said second relay independently of said pulses.

References Cited in the file of this patent

UNITED STATES PATENTS

| | | | |
|---|---|---|---|
| 2,405,231 | Newhouse | Aug. 6, | 1946 |
| 2,419,205 | Feldman | Apr. 22, | 1947 |
| 2,419,239 | White | Apr. 22, | 1947 |